United States Patent [19]
Bock et al.

[11] 3,718,518
[45] Feb. 27, 1973

[54] PROCESS OF PREPARING BONDED MATERIALS USING POLYURETHANE ADHESIVES WHICH FORM BONDS OF IMMEDIATE HIGH STRENGTH

[75] Inventors: Eugen Bock, Leverkusen; Manfred Dollhausen, Hitdorf, both of Germany

[73] Assignee: Bayer Aktiengesellschaft, Leverkusen, Germany

[22] Filed: June 9, 1970

[21] Appl. No.: 44,870

[30] Foreign Application Priority Data

June 19, 1969 Germany....................P 19 30 336.7

[52] U.S. Cl. ..................156/242, 156/307, 156/308, 156/331
[51] Int. Cl. ............B29c 3/00, C09j 3/16, C09j 5/02
[58] Field of Search...............156/242, 331, 307, 308

[56] References Cited

FOREIGN PATENTS OR APPLICATIONS 1,081,705   8/1967   Great Britain......................156/331

*Primary Examiner*—Richard D. Lovering
*Attorney*—Sylvia Gosztonyi and Robert A. Gerlach

[57] ABSTRACT

A method of providing bonded materials having a high resistance to separation immediately after bonding at room and at elevated temperatures using a hydroxyl polyurethane adhesive having a molecular weight of at least 50,000 prepared from organic diisocyanate, hydroxyl polyesters having a molecular weight of from 2,000 to 10,000 and 0.1 to 0.7 mol per mol of polyester of an alkane diol having at least four carbon atoms in the molecule. A solvent solution of the adhesive is applied to at least one of the surfaces of the articles to be bonded together and heated to a temperature of at least 70°C. to both activate the adhesive and evaporate the solvent. Immediately following the heat treatment the surfaces are pressed together forming an immediate high strength bond which is highly resistant to separation.

8 Claims, No Drawings

PROCESS OF PREPARING BONDED MATERIALS USING POLYURETHANE ADHESIVES WHICH FORM BONDS OF IMMEDIATE HIGH STRENGTH

The present invention relates to the use of adhesives based on hydroxyl polyurethanes and more particularly to the formation of high strength adhesive bonds immediately after bonding at room and at elevated temperatures.

These adhesives are particularly suitable for bonding rubber materials, homo- or copolymers of vinyl chloride which contain a plasticizer and leather to one another, particularly for bonding shoe soles made of these materials to shoe uppers made of leather or of synthetic materials which simulate leather.

Adhesives based on hydroxyl polyurethanes are known in the art and have been described, for example, in German Pat. No. 1,256,822. It is also known that such adhesives may be used for bonding a large variety of materials such as, for example, rubber, leather, soft PVC or other synthetic resins to one another. Adhesives of this type can be used by employing the so-called cold bonding process at temperatures of about 20°C. without heating the layer of adhesive in which process the layers of adhesive are kept uncovered for a limited length of time to allow most of the solvent contained in the adhesive to evaporate. A process which is considerably more efficient and reliable in its application is the heat activation process in which layers of adhesive are applied to the surfaces which are to be bonded together heated to at least 70°C by thermal or infra-red radiation and then immediately combined. In one variation of this bonding process, a liquid synthetic resin such as, for example, a vinyl chloride polymer which contains a plasticizer, is heated to about 120° to 200° C. and applied by injection molding to a layer of adhesive which is already partly dry. Once the layers have been joined together or the heated synthetic resin has been applied, it is desirable for economic reasons to remove the bonded material as quickly as possible from the expensive molding apparatus. Provided that little or no force is exerted on the bonds by the bonded material, bonds of excellent strength and permanence are obtained, particularly when adhesives made of hydroxyl polyurethanes, which have a strong tendency to crystallize, are used.

If, on the other hand, considerable forces are exerted on the bonds by the bonded materials, such as, for example in the case of strongly curved shoe soles, partial or even complete separation of the bonds, which is extremely undesirable, is observed in practice immediately after removal of the bonds from the molding apparatus, even before the crystallization of the layers of adhesive, which brings about the increase in strength, has occurred. Such separations are also observed when bonds are subjected to further treatment immediately after the molding operation, such as, for example if the edge of a shoe sole bond is milled smooth so that the bond is subjected to additional mechanical and thermal stresses.

It is therefore an object of this invention to provide hydroxyl polyurethane adhesives devoid of the limitations and undesirable properties of hydroxyl polyurethane adhesives of the prior art. Another object of this invention is to provide a method of bonding utilizing hydroxyl polyurethane adhesives. It is a further object of this invention to provide bonded articles and laminates utilizing as an adhesive a hydroxyl polyurethane.

Surprisingly it has now been found that bonds which have high strength immediately after bonding at room and at elevated temperatures, i.e., those which do not show the disadvantageous phenomena of separation described above, can be produced if, instead of the known adhesives, the adhesives used are made of linear or substantially linear hydroxyl polyurethanes which are prepared from a diisocyanate, a hydroxyl polyester which has a molecular weight of more than 2,000 and which is obtained from either an alkylene dicarboxylic acid having at least six carbon atoms and an alkanediol having at least four carbon atoms or one, which can be prepared by polycondensation of a hydroxyalkane monocarboxylic acid or by polymerization of its lactone, and an alkanediol which contains at least four carbon atoms.

The foregoing objects and other which will become apparent from the following description are accomplished in accordance with the invention, generally speaking, by employing hydroxyl polyurethanes having a molecular weight of ranging from 50,000 to 300,000 which have been obtained from organic diisocyanates, hydroxyl polyesters having a molecular weight from 2,000 to 10,000 and as a chain lengthening agent from 0.1 up to about 0.7 mol per mol of polyester of an alkane idol which contains at least four carbon atoms in the molecule. The polyesters may be prepared from either (a) alkane dicarboxylic acids containing at least six carbon atoms in the molecule and alkane diols having at least four carbon atoms in the molecule or (b) polycondensation of hydroxyl alkane monocarboxylic acids having at least five carbon atoms in the molecule or by polymerization of their corresponding lactones. The polyesters may e.g., be prepared according to the disclosure in Houben-Weyl, "Methoden der organischen Chemie", volume 14/2, Georg Thieme Verlag, Stuttgart, 1963, pages 12 to 21, particularly page 16.

Any suitable aliphatic, cycloaliphatic, araliphatic and aromatic diisocyanate may be used to prepare the hydroxyl polyurethanes which are to be used according to the invention, some of which are, for example 1,4-butane diisocyanate, 1,6-hexane diisocyanate, 1,4-cyclohexylene diisocyanate, 1-methyl-2,4-diisocyanato-cyclohexane, 1-methyl-2,6-diisocyanato-cyclohexane, 2,4-and 2,6-diisocyanatotoluene and commercial mixtures thereof, 4,4'-diphenylmethane diisocyanate, 4,4'-diphenylpropane diisocyanate and the like. 4,4'-Diphenylmethane diisocyanate is particularly preferred.

Any suitable straight chained alkane dicarboxylic acids which have at least six carbon atoms may be used such as, for example adipic acid, pimelic acid, suberic acid, azelaic acid, sebacic acid and the like. Any suitable straight chained hydroxyalkane monocarboxylic acids which have at least five carbon atoms or their lactones may be used for preparing the hydroxyl polyesters which have a molecular weight of more than 2,000. Hydroxyl polyesters obtained from adipic acid and butane-1,4-diol or from adipic acid and hexane-1,6-diol and polyesters derived from ε-caprolactone which have a molecular weight of more than 2,000 are particularly suitable.

Any suitable alkanediols which have at least four carbon atoms are suitable for preparing the polyurethanes and the polyesters to be used according to the invention some of which are, for example, butane-1,2-diol, butane-1,3-diol, butane-1,4-diol, pentane-1,5-diol, hexane-1,2-diol, hexane-1,4-diol, hexane-1,6-diol, methylhexane-1,6-diol, trimethylhexane diol, 1,10-decanediol, and the like.

The hydroxyl polyurethanes which are to be used according to the invention are prepared by heating the hydroxyl polyesters and the alkanediol until the mixture is completely molten and then the diisocyanate is added in the quantity required for obtaining the desired molecular weight. The reaction mixture is then kept at from about 100° to about 160°C. for several hours, preferably from about 8 to about 12 hours.

The hydroxyl polyurethanes obtained yield highly viscous adhesives with solvents, such as, for example, acetone, methyl ethyl ketone, tetrahydrofuran, dioxane or dimethyl formamide, ketones, particularly methyl ethyl ketone are the preferred solvents. The viscosity of these adhesives can be adjusted to the particular requirements of the bonding process or to the materials which are to be bonded by varying the hydroxyl polyurethane content. For most applications an adhesive viscosity of 5 to 100 Poise at 20°C is preferred. This corresponds to a content of hydroxyl polyurethanes of 10 to 30 percent by weight.

Natural or synthetic resins, such as, for example phenol resins, ketone resins, colophony derivatives, phthalate resins, acetyl cellulose or nitrocellulose or other substances such as, silicate fillers may be added to the adhesives described above for the purpose of obtaining particular properties, such as, for example to increase the contact setting time.

The adhesives, in the form of a solution, are used by applying them to the surfaces of the materials which surfaces are to be bonded together and which may previously have been roughened or prepared in some other manner, as e.g., by solvent wiping.

The application of adhesive may be carried out, for example, by rolling, brushing, doctoring, spraying or some other desirable means. The coats of adhesive are heated to at least 70°C to activate them and to substantially evaporate the solvents contained in them, and they are then immediately pressed together or alternatively, a liquid synthetic resin which has been heated to from 120° to 200°C., such as, for example, a vinyl chloride polymer which contains a plasticizer, is applied by the injection molding process to a surface of material which is covered with a layer of adhesive which has already partly dried. In general the adhesives are applied in quantities corresponding to 20 to 80g per m² of hydroxy polyurethane. The pressure which are normally applied to bond the materials together varies from 1 to 5 kg per cm². The injection molding process is particularly interesting for the manufacturing of shoes. In this case the adhesive is coated on a shoe upper and after partially drying a PVC compound heated to 120 to 200°C is molded on said adhesive coat by an injection molding process to form a shoe sole. The PVC compound used for this application is preferably a blend of PVC with 30 to 55 percent by weight of a dialkyl phthalate plasticizer. Preferred plasticizers are diethyl phthalate, dibutyl phthalate, dihexyl phthalate or dioctyl phthalate.

Numerous materials, such as, for example paper, cardboard, wood, metal and synthetic resins can be bonded very firmly with the hydroxyl polyurethane described.

The invention is further illustrated, but it is not intended that it be limited by the following examples, in which all parts and percentages are by weight unless otherwise specified.

EXAMPLES

The adhesives specified in Table 1 were prepared from hydroxyl polyurethanes using methyl ethyl ketone as a solvent. The viscosity of these adhesives was adjusted to about 50 poises determined at 20°C. with a Brookfield Rotation Viscosimeter LVF. The starting materials used for preparing the dissolved hydroxyl polyurethanes are as indicated in Table 2. The reaction was carried out by heating the hydroxyl polyester and alkane diol together until the mixture was completely molten and then adding the diisocyanate. The reaction mixture was then heated at about 140°C. for about 10 hours. Table 3 shows the composition of the hydroxyl polyesters used, which were prepared in a known manner.

Bonds were produced with the adhesives set forth in Table 1, the following material being used for this purpose:

a. a 4 mm thick commercial rubber material of acrylonitrile butadiene rubber (acrylonitrile content 33 percent, Defo hardness 700 according to DIN 53514) which contained approximately 31 percent of silicate filler (Shore hardness A of rubber material 85 according to DIN 53505), and b. a 4 mm thick PVC material of 70 parts by weight of polyvinyl chloride (K value 80), 30 parts by weight of dioctyl phthalate as a plasticizer and 5 parts by weight of epoxidized soya bean oil and 1.2 parts by weight of barium cadmium laurate.

Before the adhesives listed in Table 1 were applied, the surfaces of the materials, which had been cut up into strips measuring about 15cm × 3cm, were thoroughly roughened with a Grade 40 sanding belt. When the materials had been freed from sanding dust and covered with the individual adhesives, they were heated in a heating cupboard at about 80°C. and the bonds were then joined together and compressed at a pressure of about 3 kg/cm² for about 15 seconds. A determination of the resistances to separation as shown in Table 4 was carried out within the next 30 seconds by a method based on DIN 53274. Examples 11 and 12 are comparison examples in which adhesives not pertaining to the invention were used.

TABLE 1

| Adhesives | Hydroxyl polyurethane | Hydroxyl polyurethane content % |
|---|---|---|
| A | A | 18.3 |
| B | B | 18.1 |
| C | C | 18.8 |
| D | D | 18.3 |
| E | E | 19.1 |
| F | F | 18.7 |
| G | G | 18.1 |
| H | H | 17.9 |
| I | I | 18.6 |
| J | J | 18.2 |
| K | K | 18.9 |
| L | L | 19.0 |

TABLE 2

| Hydroxyl Polyurethane | 4,4'-Diphenylmethane diisocyanate (Parts) | Hydroxyl Polyester (1000 Parts) | Butane-1,4-diol (Parts) |
|---|---|---|---|
| A | 118.27 | Polyester I | 12.18 |
| B | 135.17 | Polyester I | 18.27 |
| C | 129.85 | Polyester II | 10.80 |
| D | 139.90 | Polyester II | 14.40 |
| E | 149.92 | Polyester II | 18.00 |
| F | 159.82 | Polyester II | 21.60 |
| G | 86.20 | Polyester III | 8.88 |
| H | 98.45 | Polyester III | 13.31 |
| I | 162.60 | Polyester IV | 16.74 |
| J | 185.85 | Polyester IV | 25.12 |
| K | 84.47 | Polyester I | |
| L | *69.54 | Polyester II | |

*Prepared with toluylene diisocyanate instead of 4,4'-diphenylmethane diisocyanate.

TABLE 3

| Hydroxyl Polyester | OH No. | Adipic Acid (Parts) | Butane-1,4-diol (Parts) | Hexane-1,6-diol (Parts) |
|---|---|---|---|---|
| I | 37.9 | 1460 | 962 | |
| II | 44.8 | 1460 | | 1290 |
| III | 27.6 | 1460 | | 1248 |
| IV | 52.1 | Poly-ε-caprolactone | | |

TABLE 4

Immediate strength of bonds at about 80°C. in the separation test according to DIN 53274

| Example | Adhesive | Bonds: Rubber material/ Rubber material | Bonds: PVC material/ PVC material |
|---|---|---|---|
| 1 | A | 3.3 kg wt/cm | 3.9 kg wt/cm |
| 2 | B | 4.2 kg wt/cm | 5.1 kg wt/cm |
| 3 | C | 3.4 kg wt/cm | 3.7 kg wt/cm |
| 4 | D | 3.9 kg wt/cm | 4.5 kg wt/cm |
| 5 | E | 4.4 kg wt/cm | 5.9 kg wt/cm |
| 6 | F | 4.0 kg wt/cm | 5.3 kg wt/cm |
| 7 | G | 4.5 kg wt/cm | 6.1 kg wt/cm |
| 8 | H | 4.2 kg wt/cm | 5.4 kg wt/cm |
| 9 | I | 3.5 kg wt/cm | 4.0 kg wt/cm |
| 10 | J | 4.2 kg wt/cm | 5.0 kg wt/cm |
| 11 (Comparison)* | K | 0.6 kg wt/cm | 0.9 kg wt/cm |
| 12 (comparison)* | L | 0.4 kg wt/cm | 0.7 kg wt/cm |

*according to German Patent Application 1,256,922

It is to be understood that any of the components and conditions mentioned as suitable herein can be substituted for its counterpart in the foregoing examples and that although the invention has been described in considerable detail in the foregoing, such detail is solely for the purpose of illustration. Variations can be made in the invention by those skilled in the art without departing from the spirit and scope of the invention except as is set forth in the claims.

What is claimed is:

1. A process of preparing bonded materials which comprises applying an hydroxyl terminated polyurethane having a molecular weight of 50,000 to 300,000, obtained from an organic diisocyanate, an hydroxyl polyester having a molecular weight of from 2,000 to 10,000 and 0.1 to 0.7 mol per mol of polyester of an alkane diol having at least four carbon atoms in the molecule, to at least one of the surfaces of the materials to be bonded together, heating the coated materials at a temperature of at least 70°C and compressing the coated surfaces together immediately subsequent to heating.

2. The process of claim 1 wherein the hydroxyl polyurethane is applied as a solution in an inert organic solvent.

3. The process of claim 1 wherein the diisocyanate is 4,4'-diphenylmethane diisocyanate.

4. The process of claim 1 wherein the alkane diol is butane-1,4-diol.

5. The process of claim 1 wherein the polyester is prepared from adipic acid and hexane-1,6-diol.

6. The process of claim 1 wherein the materials to be bonded together is polyvinylchloride.

7. The process of claim 1 wherein the adhesive is coated on a shoe upper and after partially drying, a PVC compound heated to 120° to 200°C is molded on said adhesive coat by an injection molding process to form a shoe sole.

8. The process of claim 7 wherein the PVC compound is a mixture of PVC and 30 to 55 parts by weight (based on total PVC compound) of a dialkyl phthalate plasticizer.

* * * * *